United States Patent [19]

Lamphron et al.

[11] Patent Number: 5,761,542
[45] Date of Patent: Jun. 2, 1998

[54] ONE-TIME-USE CAMERA WITH FILM DOOR WHICH WHEN OPENED TO REMOVE FILM CARTRIDGE BREAKS ANTI-BACKUP PAWL FOR FILM WINDER WHEEL

[75] Inventors: Mark A. Lamphron, Rochester; David Cipolla, Pittsford, both of N.Y.

[73] Assignee: Eastman Kodak Company, Rochester, N.Y.

[21] Appl. No.: 867,753

[22] Filed: Jun. 3, 1997

[51] Int. Cl.$^6$ .................................................. G03B 17/02
[52] U.S. Cl. ............................................. 396/6; 396/396
[58] Field of Search ........................................ 396/6, 396

[56] References Cited

U.S. PATENT DOCUMENTS

| | | |
|---|---|---|
| 5,235,366 | 8/1993 | Kucmerowski. |
| 5,329,330 | 7/1994 | Sakai et al.. |
| 5,349,410 | 9/1994 | Kamata. |
| 5,517,270 | 5/1996 | Balling. |
| 5,555,052 | 9/1996 | Pearson. |
| 5,579,070 | 11/1996 | Smart et al.. |

FOREIGN PATENT DOCUMENTS 7-295152A  11/1995  Japan.

*Primary Examiner*—David M. Gray
*Attorney, Agent, or Firm*—Roger A. Fields

[57] ABSTRACT

A one-time-use camera comprising a film winder wheel rotatable in a film winding direction and a rear cover part with an integral door portion that is to be opened to remove a film cartridge from a cartridge chamber, an integral anti-backup pawl for engaging the film winder wheel to prevent rotation of the film winder wheel in a reverse direction opposite to the film winding direction, and a weakened longitudinal section between the door portion and another portion of the rear cover part that fractures when the door portion is opened, is characterized in that the anti-backup pawl and the door portion are connected to cause the anti-backup pawl to be moved with the door portion when the door portion is opened, and the weakened longitudinal section extends between the anti-backup pawl and the other portion of the rear cover part to fracture between the anti-backup pawl and the other portion, in addition to fracturing between the door portion and the other portion, when the door portion is opened, whereby the anti-backup pawl will be renedered ineffective to prevent reverse rotation of the film winder wheel.

2 Claims, 4 Drawing Sheets

5,761,542

ONE-TIME-USE CAMERA WITH FILM DOOR WHICH WHEN OPENED TO REMOVE FILM CARTRIDGE BREAKS ANTI-BACKUP PAWL FOR FILM WINDER WHEEL

FIELD OF THE INVENTION

The invention relates generally to the field of photography, and in particular to one-time-use cameras.

BACKGROUND OF THE INVENTION

Film and cameras that are all in one, commonly referred to as single-use or one-time-use cameras, have become well known. Typically, the one-time-use camera is a simple point-and-shoot type comprising a plastic main body part which supports a conventional 35 mm film cartridge in a cartridge receiving chamber, a film take-up spool in a film supply chamber, a fixed-focus taking lens, a film metering mechanism with a rotatably supported metering sprocket that engages the filmstrip, a manually rotatable thumbwheel rotatably engaged with a film spool inside the film cartridge, a single-blade shutter, a manually depressible shutter release button, a rotatable frame counter for indicating the number of exposures remaining for picture-taking, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

To use the one-time-use camera, after the photographer takes a picture he manually rotates the thumbwheel in a film winding direction to similarly rotate the film spool inside the film cartridge. This winds an exposed section of the filmstrip into the film cartridge. The rewinding movement of the filmstrip the equivalent of slightly more than one frame width rotates the metering sprocket in engagement with the filmstrip, to decrement the frame counter to its next lower-numbered setting and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip are exposed, and the filmstrip is completely wound off the take-up spool and wound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer, and he forwards the used camera parts to the manufacturer for recycling, i.e. remanufacture.

Typically, during original manufacture or recycling (remanufacture) of the one-time-use camera, a film leader protruding from a fresh cartridge is attached to the film take-up spool, the fresh cartridge and the film take-up spool are loaded into the cartridge receiving and film supply chambers, and an intermediate leader section which bridges the film take-up spool and the fresh cartridge is engaged with the metering sprocket. The front and rear cover parts are connected to the main body part and/or to the front cover part to complete the camera unit. Then, an engageable end of the take-up spool which protrudes from the film roll chamber is rotated to factory prewind substantially the entire length of the unexposed filmstrip from the fresh cartridge onto the film take-up spool and to rotate the metering sprocket to increment the frame counter to its total-available frame number setting. Lastly, the outer box or label is placed on the camera unit.

Prior Art Problem

There is a need recognized in the industry to prevent recycling of one-time-use cameras that results in degraded camera quality and, therefore, possibly poor pictures. Recycled cameras can be of lesser quality than originally manufactured cameras because the reused parts may be worn. This problem is further described in U.S. Pat. No. 5,452,033 issued Sep. 19, 1995 and U.S. Pat. No. 5,235,366 issued Aug. 10, 1993.

One example of a possible solution to the problem is disclosed in prior art U.S. Pat. No. 5,349,410 issued Sep. 20, 1994. This patent suggests as a way to prevent recycling that an anti-backup pawl for the thumbwheel be broken when the rear cover part is separated from the main body part to obtain the film cartridge from the cartridge receiving chamber. The rear cover part has a projecting hook that extends through a hole in the anti-backup pawl to engage the pawl. The anti-backup pawl is connected to the main body part at a location which includes a weakened notch section. Thus, separating the rear cover part from the main body part breaks the anti-backup pawl away from the main body part at the weakened notch section.

Another example of a possible solution to the problem is for the rear cover part to have an integral door portion that is to be opened to remove the film cartridge from the cartridge receiving chamber and to have a grooved line of weakness between the door portion and a remaining portion of the rear cover part. The grooved line of weakness forms a living hinge between the door portion and the remaining portion of the rear cover part which tends to fracture when the door portion is opened. The fracture allows the door portion to be readily separated from the remaining portion of the rear cover part, to leave a large opening to the main body part which allows ambient light to enter the cartridge receiving chamber. The fracture, often however, may not be sufficient to readily separate the door portion from the remaining portion of the rear cover part. Consequently, the rear cover part might be reused, provided an opaque tape is adhered to the fractured line of weakness to prevent any possible light leak.

SUMMARY OF THE INVENTION

A one-time-use camera comprising a film winder wheel rotatable in a film winding direction and a rear cover part with an integral door portion that is to be opened to remove a film cartridge from a cartridge chamber, an integral anti-backup pawl for engaging the film winder wheel to prevent rotation of the film winder wheel in a reverse direction opposite to the film winding direction, and a weakened longitudinal section between the door portion and another portion of the rear cover part that fractures when the door portion is opened, is characterized in that:

the anti-backup pawl and the door portion are connected to cause the anti-backup pawl to be moved with the door portion when the door portion is opened; and the weakened longitudinal section extends between the anti-backup pawl and the other portion of the rear cover part to fracture between the anti-backup pawl and the other portion, in addition to fracturing between the door portion and the other portion, when the door portion is opened, whereby the anti-backup pawl will be renedered ineffective to prevent reverse rotation of the film winder wheel.

DETAILED DESCRIPTION OF THE INVENTION

Figure 1:
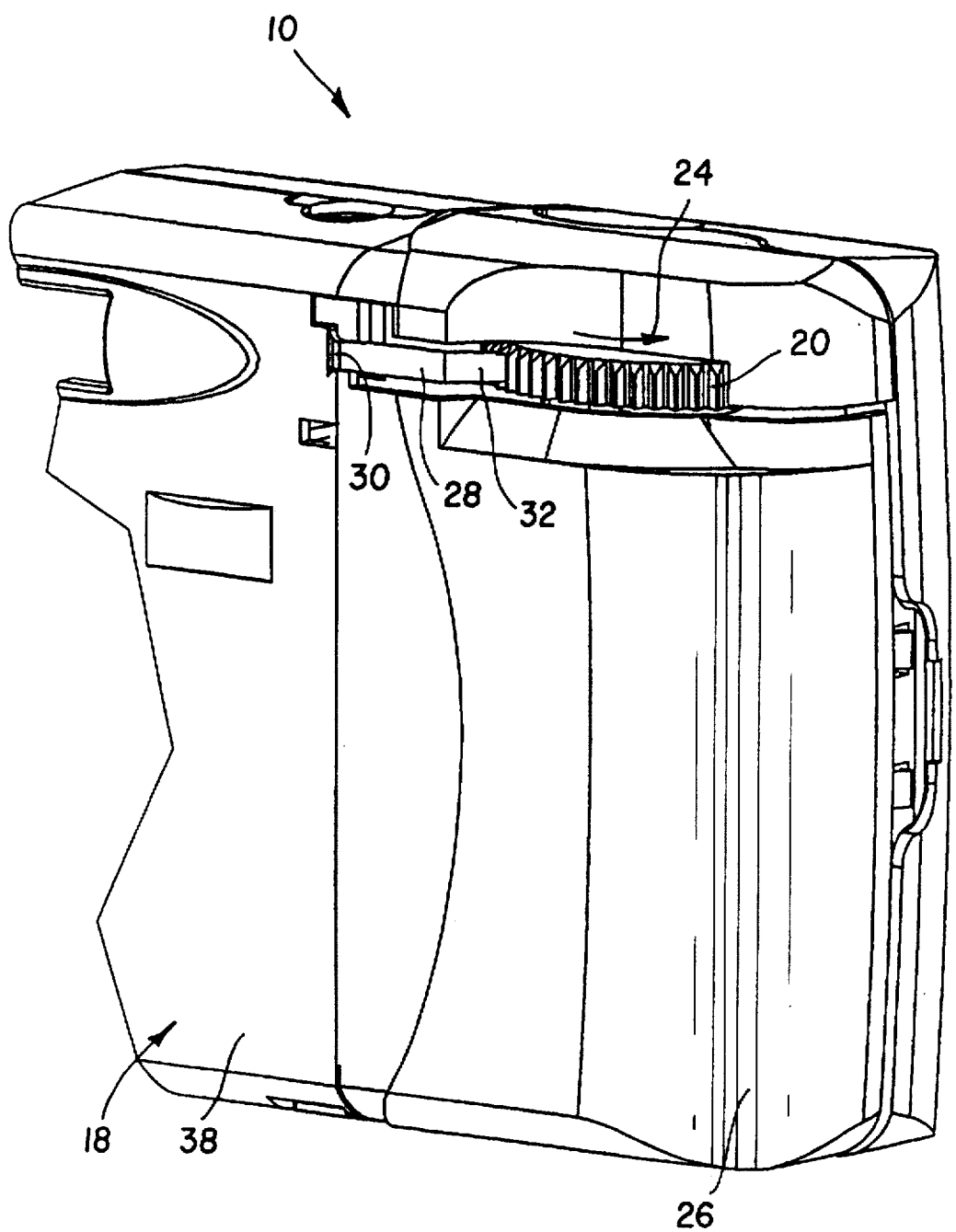
FIG. 1 is a rear perspective view of a one-time-use camera according to a preferred embodiment of the invention, showing an integral door portion of a rear cover part closed.

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1-4 partially show a one-time-use camera 10 having a plastic main body part 12 which supports a conventional 35mm film cartridge 14 in a cartridge receiving chamber 16. A plastic rear cover part 18 is connected to the main body part 12 to make the main body part light-tight. A thumbwheel 20 coaxially engaged with a film spool 22 of the film cartridge 14 is manually rotatable in a film winding direction 24 to similarly rotate the film spool, to wind successive exposed sections of a filmstrip (not shown) into the film cartridge.

Figure 2:
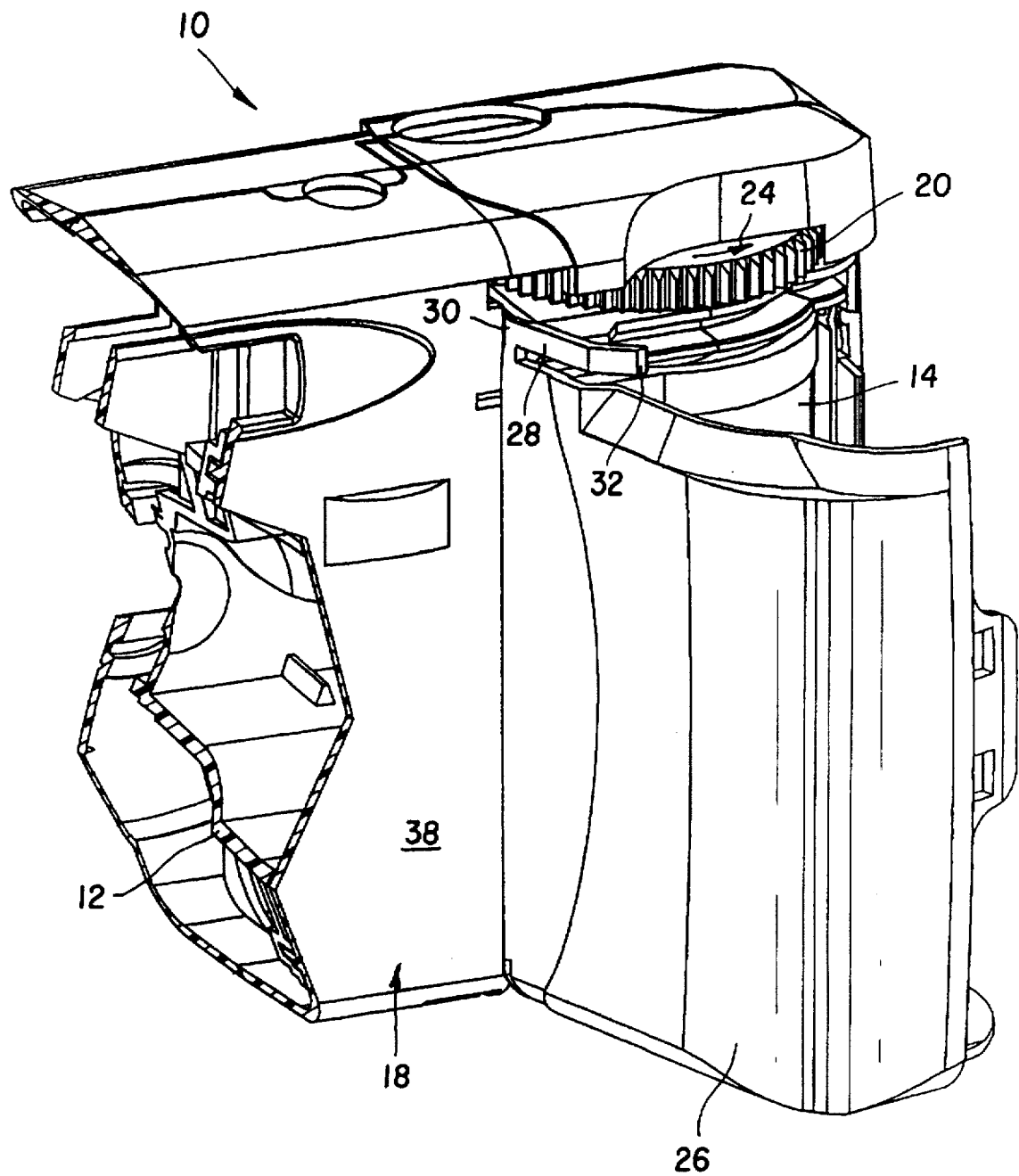
FIGS. 2-4 are rear perspective views of the one-time-use camera, showing the door portion opened.
Figure 3:
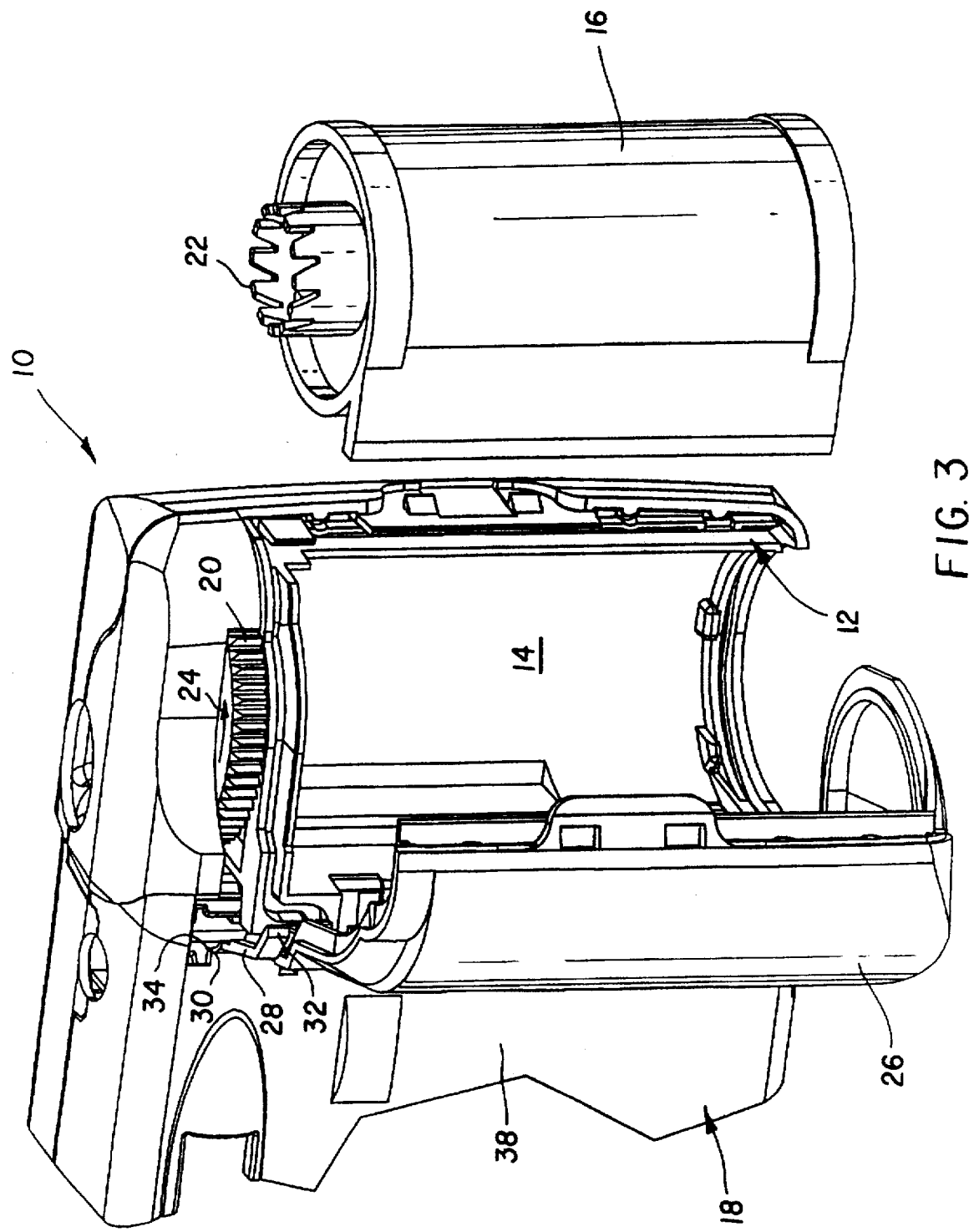
Figure 4:
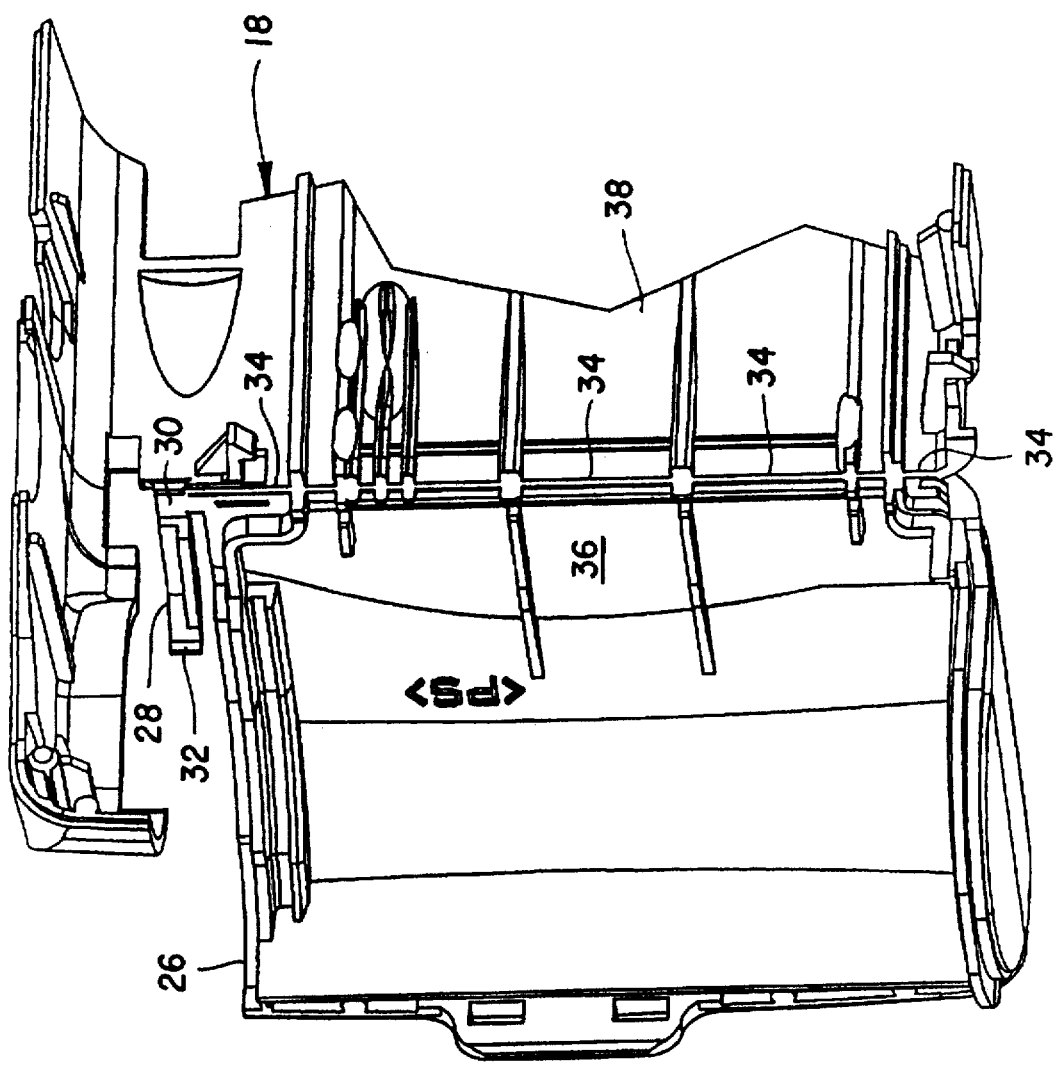

The rear cover part 18 has an integrally formed door portion 26 that is to be opened to remove the film cartridge 14 from the chamber 16, as shown in FIGS. 2 and 3, an integrally formed anti-backup pawl 28. The anti-backup pawl 28 is a cantilevered beam having a fixed end 30 connected to the door portion 26 and a free end 32 that peripherally engages the thumbwheel 20 to prevent rotation of the thumbwheel in a reverse direction opposite to the film winding direction 24. When the door portion 26 is opened, the anti-backup pawl 28 is moved with the door portion to separate (disengage) the free end 32 of the anti-backup pawl from the thumbwheel 20.

A weakened longitudinal section 34 of the rear cover part 18, preferably a v-shaped groove in the rear cover part, is located at an inner side 36 of the rear cover part to extend between the door portion 26 including the fixed end 30 of the anti-backup pawl 28 and the remaining (major) portion 38 of the rear cover part. See FIG. 4. Consequently, when the door portion 26 is opened, the weakened longitudinal portion 34 is fractured entirely along its length. The fracture may not separate the door portion 26 from the remaining portion 38 of the rear cover part 18. Non-the-less, the fracture renders the anti-backup pawl 28 ineffective to prevent reverse rotation of the thumbwheel 20. In this instance, reverse rotation of the thumbwheel 20 would dislodge the free end 32 of the anti-backup pawl 28 from any engagement with the thumbwheel.

The invention has been described with reference to a preferred embodiment. However, it will be appreciated that variations and modifications can be effected by a person of ordinary skill in the art without departing from the scope of the invention.

PARTS LIST 10. one-time-use camera
12. main body part
14. film cartridge
16. cartridge receiving chamber
18. rear cover part
20. thumbwheel
22. film spool
24. film winding direction
26. door portion
28. anti-backup pawl
30. fixed end
32. free end
34. weakened longitudinal section
36. inner side
38. remaining portion

What is claimed is:

1. A one-time-use camera comprising a film winder wheel rotatable in a film winding direction and a rear cover part with an integral door portion that is to be opened to remove a film cartridge from a cartridge chamber, an integral anti-backup pawl for engaging said film winder wheel to prevent rotation of the film winder wheel in a reverse direction opposite to the film winding direction, and a weakened longitudinal section between said door portion and another portion of said rear cover part that fractures when the door portion is opened, is characterized in that:

said anti-backup pawl and said door portion are connected to cause the anti-backup pawl to be moved with the door portion when the door portion is opened; and said weakened longitudinal section extends between said anti-backup pawl and said other portion of the rear cover part to fracture between the anti-backup pawl and the other portion, in addition to fracturing between the door portion and the other portion, when said door portion is opened, whereby said anti-backup pawl will be renedered ineffective to prevent reverse rotation of said film winder wheel.

2. A one-time-use camera as recited in claim 1, wherein said weakened longitudinal section includes a groove in said rear cover part at an inner side of the rear cover part.

* * * * *